US012771630B2

(12) United States Patent
Bhagavathiperumal et al.

(10) Patent No.: US 12,771,630 B2
(45) Date of Patent: Oct. 20, 2026

(54) SYSTEM AND METHOD OF GENERATING MULTI-VENDOR NETWORK FABRIC DIGITAL TWINS BASED ON INTENT

(71) Applicant: Aviz Networks, Inc., San Jose, CA (US)

(72) Inventors: Chidambaram Bhagavathiperumal, Livermore, CA (US); Vishal Shukla, San Jose, CA (US); Naresh Kumar, Bangalore (IN)

(73) Assignee: Aviz Networks, Inc., San Jose, CA (US)

( * ) Notice: Subject to any disclaimer, the term of this patent is extended or adjusted under 35 U.S.C. 154(b) by 173 days.

(21) Appl. No.: 18/827,728

(22) Filed: Sep. 7, 2024

(65) Prior Publication Data

US 2026/0074981 A1 Mar. 12, 2026

(51) Int. Cl.
*H04L 43/55* (2022.01)
*H04L 41/122* (2022.01)

(52) U.S. Cl.
CPC ............ *H04L 43/55* (2022.05); *H04L 41/122* (2022.05)

(58) Field of Classification Search
CPC ... H04L 43/55; H04L 41/122; H04L 41/0806; H04L 41/145; H04L 43/50
See application file for complete search history.

(56) References Cited

U.S. PATENT DOCUMENTS

2020/0162354 A1* 5/2020 Drees ..................... G06N 5/022
2020/0412810 A1* 12/2020 Knight .................... H04L 43/04
2021/0306416 A1* 9/2021 Mukhopadhyay .. G06F 11/2023
2022/0163959 A1* 5/2022 Cella ................... G01M 13/028
2022/0207386 A1* 6/2022 Todd ....................... G06F 16/27
2022/0229424 A1* 7/2022 Linder ............. G05B 19/41885
2023/0281358 A1* 9/2023 Kumar .................... G06F 30/20 703/1
2024/0278116 A1* 8/2024 Peltier ..................... A63F 13/52
2024/0345812 A1* 10/2024 Tashkandi ............. G06F 9/4856
2024/0414558 A1* 12/2024 Haustein ............... H04L 41/145
2025/0139324 A1* 5/2025 Johari ...................... G06F 30/18
2026/0037894 A1* 2/2026 Kemner ........... G06Q 10/06334

FOREIGN PATENT DOCUMENTS

EP 3512155 A1 * 7/2019 ............ G06F 9/485

* cited by examiner

*Primary Examiner* — Javier O Guzman
(74) *Attorney, Agent, or Firm* — Select IP Law Corporation; Ashkon Cyrus

(57) ABSTRACT

In some aspects, the method may include receiving, by an administrator interface, configuration inputs in one or more formats. Also, the method may include ingesting, by a fabric manager of a network fabric, the received configuration inputs. Furthermore, the method may include processing, by the fabric manager, the ingested configuration inputs to create configuration artifacts. In addition, the method may include generating, by the fabric manager, a topology. Furthermore, the method may include deploying the network fabric as a staging network in cloud or on-prem servers to create a digital twin.

16 Claims, 4 Drawing Sheets

SYSTEM AND METHOD OF GENERATING MULTI-VENDOR NETWORK FABRIC DIGITAL TWINS BASED ON INTENT

BACKGROUND

NetDevOps is a field that combines network operations (NetOps) with development and operations (DevOps) principles. It involves using automation, continuous integration, and continuous delivery (CI/CD) to manage and deploy network infrastructure. The goal is to make network management more efficient, reliable, and scalable by applying software development practices to networking. This includes automating repetitive tasks, testing network configurations before deployment, and ensuring that network changes can be quickly and safely implemented.

Traditionally, network administrators relied heavily on manual configuration and visual verification of network topologies and settings in their network management routines. This approach, while effective in certain scenarios, often led to inefficiencies, higher chances of human error, and slower response times to network issues.

Another big problem with manual configuration is it often skips the step of creating a visual representation and providing details before deploying the configuration. What is needed is a way for a network administrator to generate a digital twin of the networks which can be based on the "intent" and where a network administrator can do a NetDevOps specific activity to validate it, before this intent can be deployed.

SUMMARY

The present disclosure is directed towards systems and methods of generating multi-vendor network fabric digital twins based on intent. According to an embodiment, generating a digital twin includes generating artifacts of topologies and configurations.

Embodiments of the present disclosure further provide deploying the digital twin to staging. According to an embodiment of the present disclosure, a NetDevOps is applied before the configuration is deployed.

According to a further embodiment of the present disclosure, the generation of network fabric digital twins is performed in a multi-vendor construct. That is, the system can perform this method for multiple vendors.

DETAILED DESCRIPTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, an example method may include receiving, by an administrator interface, configuration inputs in one or more formats. The method may also include ingesting, by a fabric manager of a network fabric, the received configuration inputs. The method may furthermore include processing, by the fabric manager, the ingested configuration inputs to create configuration artifacts. The method may in addition include Generating, by the fabric manager, a topology. The method may moreover include selecting, based on the received configuration inputs, an appliance from a repository. The method may also include selecting, based on the received configuration inputs, a test to be executed, where applicable scripts are selected from the repository. The method may furthermore include deploying the network fabric as a staging network in cloud or on-prem servers to create a digital twin. Other embodiments of this aspect include corresponding computer systems, apparatus, and computer programs recorded on one or more computer storage devices, each configured to perform the actions of the methods.

Implementations may include one or more of the following features. The method where the topology is a pictorial view of the network fabric. The method where the configuration artifacts are created based on internal logic tailored for each vendor of a plurality of vendors. The method may include invoking the selected scripts. The method may include connecting to the digital twin and starting testing. The method may include presenting the results to an administrator. Implementations of the described techniques may include hardware, a method or process, or a computer tangible medium.

Figure 1:
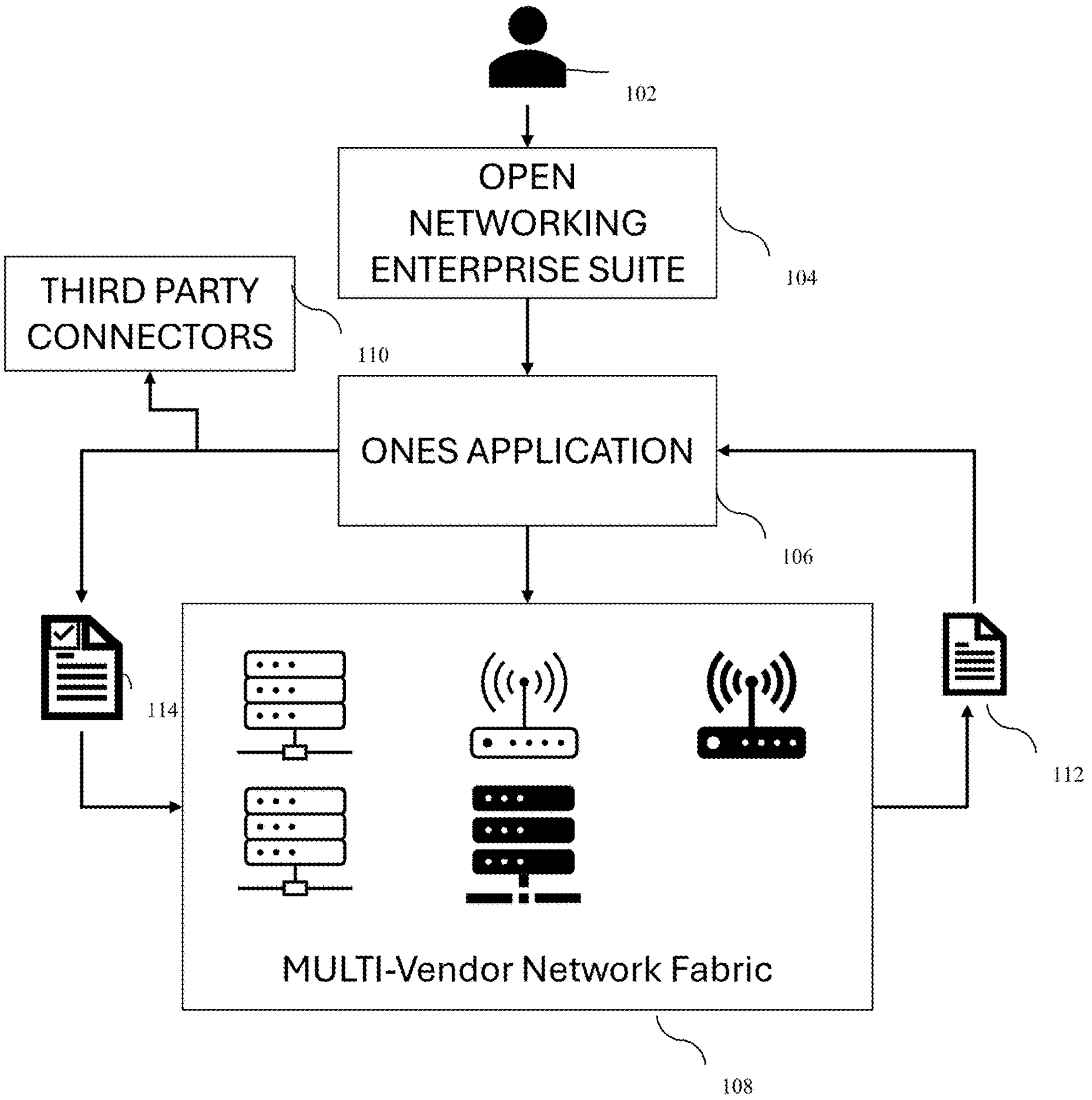
FIG. 1 discloses a system architecture according to an embodiment of the present disclosure.

FIG. 1 discloses a system architecture according to an embodiment of the present disclosure. In this system, a network administrator 102 provides support to an open networking enterprise suite 104, which is responsible for orchestration, visibility, and assurance within the network.

The hardware implementation of the Open Networking Enterprise Suite is configured to support multi-vendor deployments, optimize total cost of ownership (TCO), and enable future-proof AI networks. This implementation involves a robust architecture comprising network switches, servers, and network interface cards (NICs) from various vendors, ensuring seamless integration, high performance, and scalability.

Network switches from various switch vendors can be used, all supporting software such as SONiC (Software for Open Networking in the Cloud) to ensure smooth operation. High-performance servers from a variety of manufacturers handle network management and AI workloads. These servers should include high-capacity NVMe SSDs for fast data storage and retrieval, essential for AI training and inference. Additionally, high-speed NICs, such as 100 GbE or 400 GbE cards, provide the necessary bandwidth and low-latency connectivity between network components.

According to an embodiment, the software stack for an Open Networking Enterprise Suite (ONES) includes SONiC as a primary network operating system, offering a scalable and flexible platform for network management. Orchestration and management tools manage containerized applications, and customized software can automate network configuration tasks and provide real-time monitoring and alerting, and tools like Grafana may be used to enable data visualization through customizable dashboards. For AI and data analytics, frameworks like TensorFlow or PyTorch can be utilized, while Apache Kafka ensures efficient real-time data streaming and processing.

In a data center deployment, a leaf-spine architecture is implemented using multi-vendor switches running SONiC, with high-speed NICs ensuring robust interconnectivity. According to an embodiment, compute clusters orchestrate scalable AI workloads and network services. In an enterprise network, SONiC-compatible switches and routers at branch offices are managed centrally through the Open Networking Enterprise Suite, with automating configuration updates and policy enforcement.

The networking suite 104 connects to an application 106 that is configured to facilitate interaction with a multi-vendor network fabric 108. According to this embodiment application 106 is a ONES application. This network fabric supports diverse network components and vendors. Additionally, the application 106 connects to a connector 110, allowing integration with third-party solutions, application 106 also directly connects into multi-vendor fabric 108. The multi-vendor network fabric 108 is responsible for generating a file 112 and an input checkpoint file 114, which are essential for maintaining system integrity and ensuring accurate network configurations.

According to an embodiment of the present disclosure, open networking suite 104 can support multi-vendor platforms while adapting to or managing networks' pre-deployment, orchestration, visibility, and supportability aspects of their DC network. Open networking suite 104 may also be referred to as a Fabric Manager. Embodiments of the present disclosure implement a common intent-based template to handle fabric-level configurations. The open networking enterprise suite 104 orchestration layer, equipped with advanced intelligence, translates these configurations into vendor-specific formats.

According to an embodiment of the present disclosure, an Open Networking Enterprise Suite orchestration agent, operating on each specific device, ensures the correct configuration is applied to the device using CLIs and ConfigDB. According to an embodiment of the present disclosure, a telemetry layer that retrieves numerous metrics using gNMI and normalizes the data, for example by using RedisDB. It can be appreciated that such an approach presents the maximum number of metrics in an accessible format, enabling network operators to correlate and diagnose issues more effectively and make quicker decisions.

Figure 2:
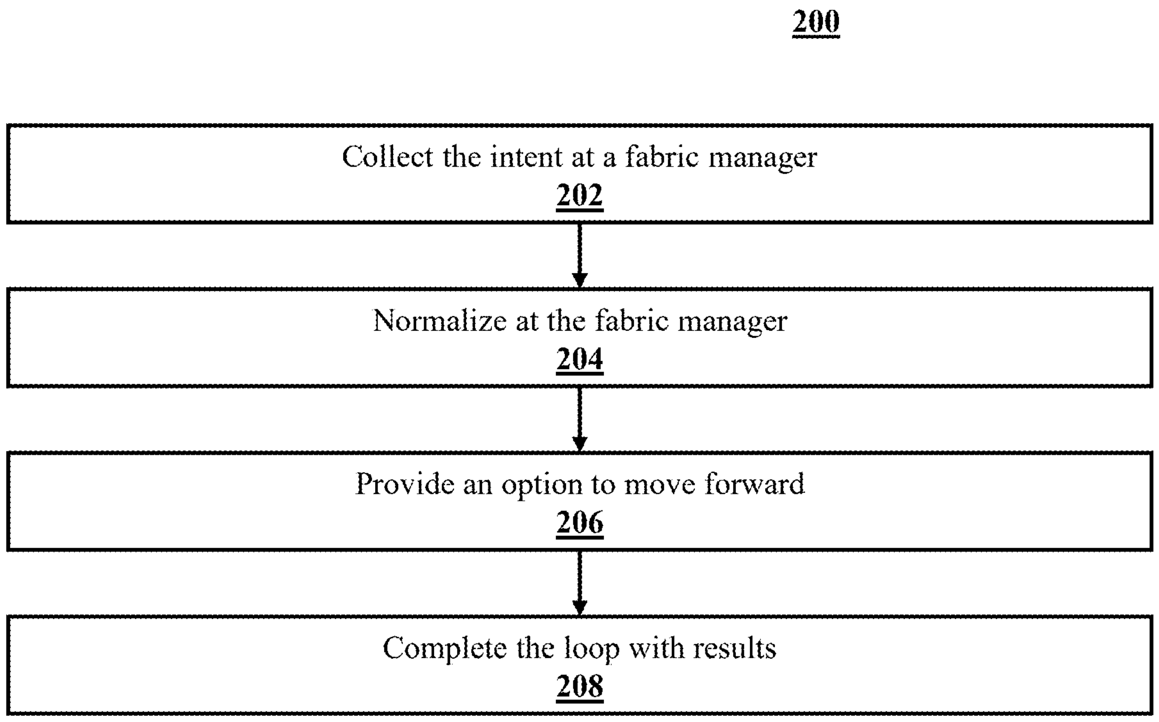
FIG. 2 discloses a method of generating a digital twin according to an embodiment of the present disclosure.

FIG. 2 discloses a method of generating a digital twin according to an embodiment of the present disclosure. First, at step 202, the intent can be ingested by Fabric Manager in a form of YAML, JSON, UI, or any other programming language. As long as it defines the inventory and the networking protocols which need to be configured on the fabric.

Next, at step 204, once the intent is ingested by the fabric manager the method proceeds to normalization at Fabric Manager: The Fabric manager will normalize the intent and then generate the artifacts. Artifacts generated can include the topology, where this can be a pictorial representation of the fabric. Artifacts generated may also include the configuration for each device, peripheral lists of each device, GNS3 appliance equivalent to each switch for multi-vendor devices and selection of NetDevOps test scripts which are applicable for this fabric validation.

Next, at step 206, an option to move forward is provided to a user or system administrator. Based on the artifacts, the network administrator will have the option to download the artifacts and verify manually. Administrator will also have an option to press a button to use the test scripts and GNS3 (or equivalent) appliance to stage the whole fabric in a cloud or on-prem and decide if the intent is right or wrong.

Next, at step 208, the method completes the loop with the NetDevOps results. Based on the results, the NetDevOps will suggest changes in the configurations and the Administrator can take actions and repeat the whole process by doing necessary changes at the source.

Figure 3:
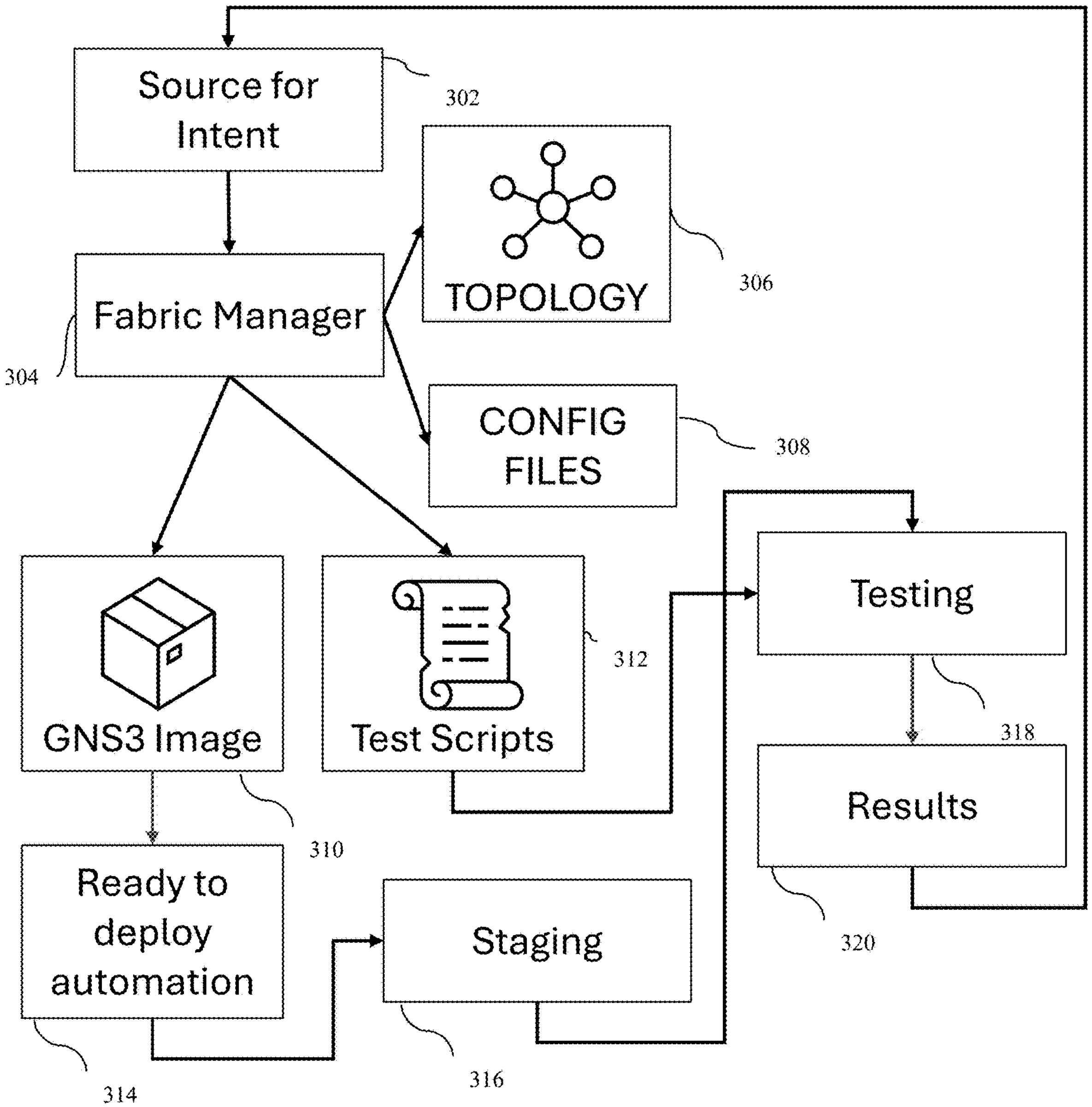
FIG. 3 illustrates a flow chart according to an embodiment of the present disclosure.

FIG. 3 illustrates a flow chart according to an embodiment of the present disclosure. The source for intent 302 can be in YAML, JSON, or in another programming language. The fabric manager 304 then creates a topology 306 and config files 308. The Fabric Manager 304 plays a pivotal role in managing and orchestrating network configurations within the infrastructure. One of its key functionalities is generating an image and test files, which are essential for deploying and verifying network setups across different environments.

Upon receiving the intent-based configurations, the Fabric Manager processes these inputs to create a comprehensive network image 310. This image encapsulates all necessary configurations, settings, and protocols required for the network's operation. It ensures that all devices within the fabric are aligned with the specified configurations, enabling consistent and reliable network performance.

In addition to the network image 310, the Fabric Manager generates test scripts. 312. These test scripts are designed to validate the network configurations and ensure their correctness before deployment. They include a variety of test cases and scenarios that simulate real-world network conditions, allowing administrators to identify and resolve potential issues proactively.

The combination of the generated image and test files provides a robust framework for deploying, testing, and maintaining network configurations. This ensures that the network is not only correctly set up but also resilient and capable of handling various operational challenges. The Fabric Manager thus significantly enhances the efficiency and reliability of network management processes.

Next, a button 314 is presented to the administrator, the controller develops an ansible playbook in background which is triggered by pressing this button—the purpose is to deploy this fabric as a staging network in the cloud or on-prem servers—hence making digital twin of the intent. The digital twin comes up as staging 316. The testing server invokes the selected scripts and connects to this digital twin and starts the testing 318.

Then results 320 are presented to the administrator and the intent is validated and challenged if needed. The intent is updated based on the results and the whole process starts again.

It can be appreciated that users can visualize a plurality of devices in the same fabric and limited metrics along with homogeneous devices. This is achieved as described above using normalized metrics for visualization.

Figure 4:
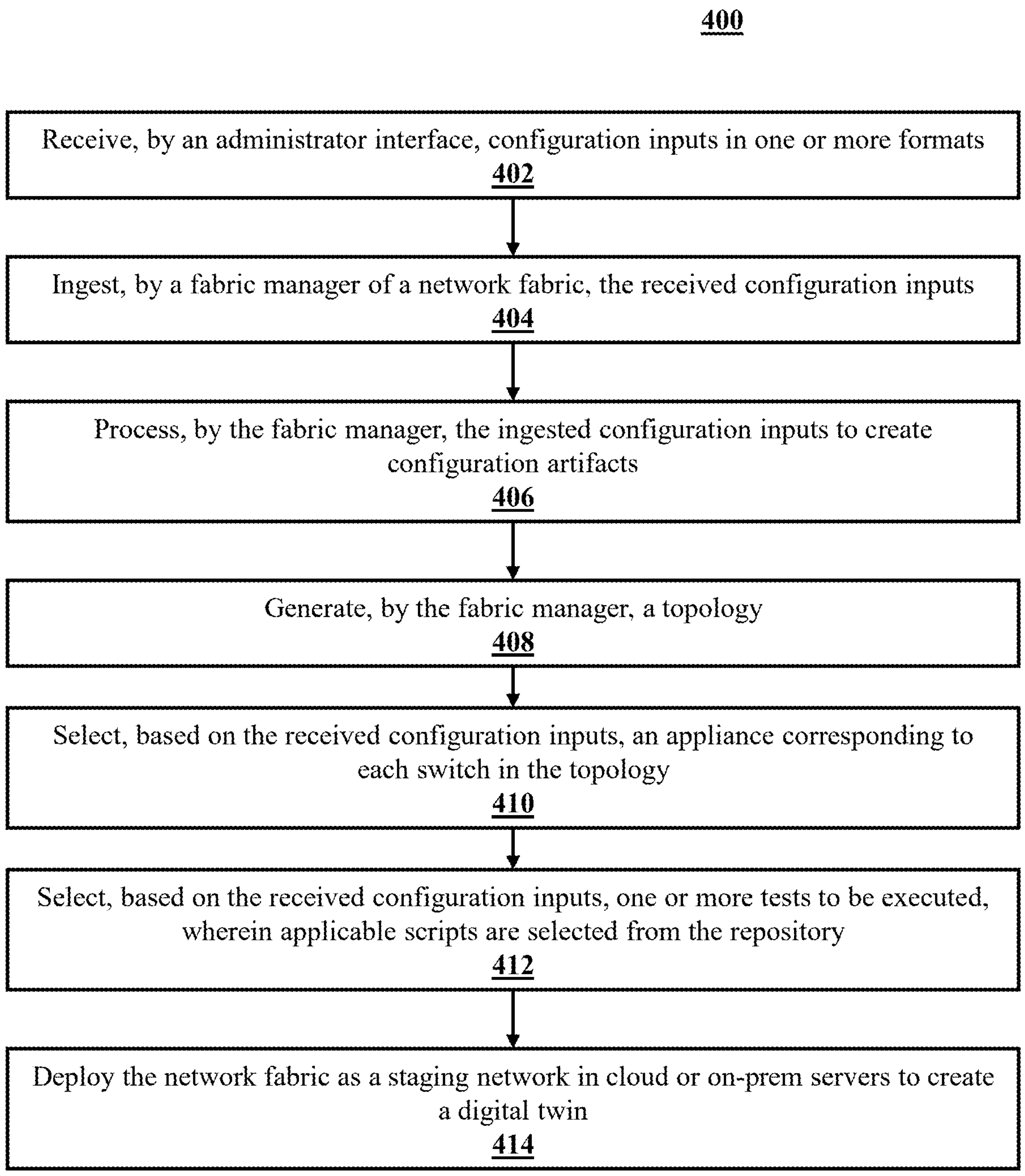
FIG. 4 is a flowchart of an example process 400 of generating multi-vendor network fabric digital twins based on intent.

FIG. 4 is a flowchart of an example process 400 of generating multi-vendor network fabric digital twins based on intent. In some implementations, one or more process blocks of FIG. 4 may be performed by a fabric manager. The fabric manager can be composed of one or more server devices that help manage and coordinate network hardware from different manufacturers. This manager acts as a central control point, overseeing and optimizing the performance of various network devices, such as switches, routers, and firewalls.

As shown in FIG. 4, process 400 may include receiving, by an administrator interface, configuration inputs in one or more formats (block 402). As also shown in FIG. 4, process 400 may include ingesting, by a fabric manager of a network fabric, the received configuration inputs (block 404. As further shown in FIG. 4, process 400 may include processing, by the fabric manager, the ingested configuration inputs to create configuration artifacts (block 406). As also shown in FIG. 4, process 400 may include Generating, by the fabric manager, a topology (block 408). As further shown in FIG. 4, process 400 may include selecting, based on the received configuration inputs, an appliance corresponding to each switch in the topology from a repository (block 410). The topology might contain many devices, so the method selects one appliance corresponding to each device. As also shown in FIG. 4, process 400 may include selecting, based on the received configuration inputs, one or more tests to be executed, where applicable scripts are selected from the repository (block 412). For example, the fabric manager may select, based on the received configuration inputs, one or more tests to be executed, where applicable scripts are selected from the repository, as described above. These tests are executed through corresponding scripts As further shown in FIG. 4, process 400 may include deploying the network fabric as a staging network in cloud or on-prem servers to create a digital twin (block 414).

Process 400 may include additional implementations, such as any single implementation or any combination of implementations described below and/or in connection with one or more other processes described elsewhere herein. In a first implementation, the topology is a pictorial view of the network fabric.

In a second implementation, alone or in combination with the first implementation, the configuration artifacts are created based on internal logic tailored for each vendor of a plurality of vendors.

A third implementation, alone or in combination with the first and second implementation, process 400 may include invoking the selected scripts.

A fourth implementation, alone or in combination with one or more of the first through third implementations, process 400 may include connecting to the digital twin and starting testing.

A fifth implementation, alone or in combination with one or more of the first through fourth implementations, process 400 may include presenting the results to an administrator.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications may be made in light of the above disclosure or may be acquired from practice of the implementations. As used herein, the term "component" is intended to be broadly construed as hardware, firmware, or a combination of hardware and software. It will be apparent that systems and/or methods described herein may be implemented in different forms of hardware, firmware, and/or a combination of hardware and software.

The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context. Although particular combinations of features are recited in the claims and/or disclosed in the specification, these combinations are not intended to limit the disclosure of various implementations. In fact, many of these features may be combined in ways not specifically recited in the claims and/or disclosed in the specification.

Although each dependent claim listed below may directly depend on only one claim, the disclosure of various implementations includes each dependent claim in combination with every other claim in the claim set. No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more."

Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

receiving, by an administrator interface, configuration inputs in one or more formats defining inventory and networking protocols of a network fabric;

ingesting, by a fabric manager of the network fabric, the received configuration inputs;

processing, by the fabric manager, the ingested configuration inputs to create configuration artifacts based on internal logic of the fabric manager tailored to translate the configuration inputs into vendor-specific format configurations for each vendor of a plurality of network hardware vendors;

generating, by the fabric manager, a topology;

selecting, based on the received configuration inputs, a network emulation appliance corresponding to each switch in the topology from a repository;

selecting, based on the received configuration inputs, a test to be executed, wherein applicable scripts are selected from the repository; and deploying the network fabric as a staging network in cloud or on-prem servers to create a digital twin using the vendor-specific configuration files by executing a dynamically generated deployment script generated in the background by the fabric manager.

2. The method of claim 1, wherein the topology is a pictorial view of the network fabric.

3. The method of claim 1, further comprising invoking the selected scripts.

4. The method of claim 3, further comprising connecting to the digital twin and starting testing.

5. The method of claim 4, further comprising presenting the results to an administrator.

6. A system comprising:

one or more processors configured to:

receive, by an administrator interface, configuration inputs in one or more formats defining inventory and networking protocols of a network fabric;

ingest, by a fabric manager of the network fabric, the received configuration inputs;

process, by the fabric manager, the ingested configuration inputs to create configuration artifacts based on internal logic of the fabric manager tailored to translate the configuration inputs into vendor-specific format configurations for each vendor of a plurality of network hardware vendors;

generate, by the fabric manager, a topology;

select, based on the received configuration inputs, a network emulation appliance corresponding to each switch in the topology from a repository;

select, based on the received configuration inputs, a test to be executed, wherein applicable scripts are selected from the repository; and deploy the network fabric as a staging network in cloud or on-prem servers to create a digital twin using the vendor-specific configuration files by executing a dynamically generated deployment script generated in the background by the fabric manager.

7. The system of claim 6, wherein the topology is a pictorial view of the network fabric.

8. The system of claim 6, wherein the one or more processors are further configured to:

invoke the selected scripts.

9. The system of claim 8, wherein the one or more processors are further configured to:

connect to the digital twin and start testing.

10. The system of claim 9, wherein the one or more processors are further configured to:

present the results to an administrator.

11. A non-transitory computer-readable medium storing a set of instructions, the set of instructions comprising:

one or more instructions that, when executed by one or more processors of a device, cause the device to:

receive, by an administrator interface, configuration inputs in one or more formats defining inventory and networking protocols of a network fabric;

ingest, by a fabric manager of the network fabric, the received configuration inputs;

process, by the fabric manager, the ingested configuration inputs to create configuration artifacts based on internal logic of the fabric manager tailored to translate the configuration inputs into vendor-specific format configurations for each vendor of a plurality of network hardware vendors;

generate, by the fabric manager, a topology;

select, based on the received configuration inputs, a network emulation appliance corresponding to each switch in the topology from a repository;

select, based on the received configuration inputs, a test to be executed, wherein applicable scripts are selected from the repository; and deploy the network fabric as a staging network in cloud or on-prem servers to create a digital twin using the vendor-specific configuration files by executing a dynamically generated deployment script generated in the background by the fabric manager.

12. The non-transitory computer-readable medium of claim 11, wherein the topology is a pictorial view of the network fabric.

13. The non-transitory computer-readable medium of claim 11, wherein the one or more instructions further cause the device to:

invoke the selected scripts.

14. The non-transitory computer-readable medium of claim 13, wherein the one or more instructions further cause the device to:

connect to the digital twin and start testing.

15. The non-transitory computer-readable medium of claim 14, wherein the one or more instructions further cause the device to:

present the results to an administrator.

16. The non-transitory computer-readable medium of claim 11, wherein the network emulation appliance comprises a Graphical Network Simulator 3 (GNS3) appliance or equivalent.

* * * * *